(12) United States Patent
Kataoka et al.

(10) Patent No.: US 7,955,110 B1
(45) Date of Patent: Jun. 7, 2011

(54) CONNECTOR WITH A CONNECTING MEMBER PRESSING INSULATORS OF TERMINALS OF TWO MATING TERMINAL HOUSINGS

(75) Inventors: Yuta Kataoka, Hitachi (JP); Hideaki Takehara, Hitachi (JP); Kunihiro Fukuda, Tsukuba (JP); Sachio Suzuki, Hitachi (JP); Jun Umetsu, Hitachi (JP); Shinya Hayashi, Hitachi (JP)

(73) Assignee: Hitachi Cable Ltd., Tokyo (JP)

( * ) Notice: Subject to any disclaimer, the term of this patent is extended or adjusted under 35 U.S.C. 154(b) by 0 days.

(21) Appl. No.: 12/854,953

(22) Filed: Aug. 12, 2010

(30) Foreign Application Priority Data

Feb. 3, 2010 (JP) ................................. 2010-022432

(51) Int. Cl.
*H01R 13/08* (2006.01)
(52) U.S. Cl. ....................................................... 439/284
(58) Field of Classification Search .................. 439/284, 439/74, 79, 374, 541.5, 260
See application file for complete search history.

(56) References Cited

U.S. PATENT DOCUMENTS

| | | | | |
|---|---|---|---|---|
| 3,614,297 | A * | 10/1971 | Carlson | 174/88 B |
| 4,737,118 | A * | 4/1988 | Lockard | 439/295 |
| 5,161,985 | A * | 11/1992 | Ramsey | 439/74 |
| 5,282,757 | A * | 2/1994 | Maeda | 439/374 |
| 5,575,674 | A * | 11/1996 | Davis et al. | 439/284 |
| 6,113,436 | A | 9/2000 | Kuwahara et al. | |
| 7,686,630 | B2 * | 3/2010 | Takehara et al. | 439/140 |
| 7,824,210 | B2 * | 11/2010 | Oka et al. | 439/372 |
| 2009/0042447 | A1 | 2/2009 | Sato | |
| 2009/0075506 | A1 | 3/2009 | Suzuki | |
| 2009/0258514 | A1 * | 10/2009 | He et al. | 439/79 |

FOREIGN PATENT DOCUMENTS

| | | |
|---|---|---|
| JP | A-S63-190269 | 8/1988 |
| JP | A-2000-003750 | 1/2000 |
| JP | A-2004-056924 | 2/2004 |
| JP | B2-4037199 | 11/2007 |
| JP | A-2008-108675 | 5/2008 |
| JP | A-2009-70754 | 4/2009 |

\* cited by examiner

*Primary Examiner* — Chandrika Prasad
(74) *Attorney, Agent, or Firm* — Scully, Scott, Murphy & Presser, P.C.

(57) ABSTRACT

A connector has a first terminal housing with first connecting terminals and a second terminal housing with second connecting terminals. When the first terminal housing and the second terminal housing are mated, one side of the first connecting terminals and one side of the second connecting terminals form pairs and provide contacts, respectively. Each of the contacts is sandwiched by an insulator. The insulator has a first isolating member configured to be fixed to other side of an adjacent first connecting terminal and to cover one surface of the adjacent first connecting terminal, and a second isolating member configured to be fixed to the other side of an adjacent second connecting terminal and to cover one surface of the adjacent second connecting terminal. The insulator is formed by overlapping the first insolating member and the second isolating member when the first terminal housing and the second terminal housing are mated.

6 Claims, 8 Drawing Sheets

CONNECTOR WITH A CONNECTING MEMBER PRESSING INSULATORS OF TERMINALS OF TWO MATING TERMINAL HOUSINGS

The present application is based on Japanese patent application No. 2010-022432 filed on Feb. 3, 2010, the entire contents of which are incorporated herein by reference.

BACKGROUND OF THE INVENTION

1. Field of the Invention

The present invention relates to a connector, for use in eco-friendly cars, such as hybrid vehicles, electric vehicles and the like, and in particular, for being capable of use for a portion to connect a power harness, which is used for large power transmission.

2. Description of the Related Art

In hybrid vehicles, electric vehicles and the like which have remarkably developed in recent years, a power harness, which is used for large power transmission for connection between devices, e.g. between a motor and an inverter or between the inverter and a battery, has at its one end a connector, which consists of two separate portions: a male connector portion with a male terminal and a first terminal housing accommodating that male terminal, and a female connector portion with a female terminal connected with the male terminal and a second terminal housing accommodating that female terminal. For example, Japanese Patent Laid-Open No. 2009-070754 (JP-A 2009-070754) discloses a connector having the aforementioned structure.

In recent years, such eco-friendly cars have been designed to reduce the weights of all parts thereof, to enhance the energy saving performance of the cars. As one effective means to reduce the weights of parts of the cars, it has been proposed to reduce the sizes of the parts.

For example, a technique as described below, which is disclosed by JP Patent No. 4037199, has been known in the art.

JP Patent No. 4037199 discloses an electrical connection structure for a vehicle, which is for connecting multiphase connecting terminals of a conductive member drawn out from a motor for driving the vehicle, and multiphase connecting terminals of a power line cable drawn out from an inverter for driving the motor, in which each phase connecting terminal of the conductive member and each corresponding phase connecting terminal of the power line cable are overlapped, and insulators are disposed on opposite surfaces to overlapped surfaces of the connecting terminals, respectively, and these overlapped connecting terminals and insulators are collectively fastened in an overlapping direction with a single bolt provided in a position to penetrate these overlapped connecting terminals and insulators.

That is, in the technique used in the electrical connector disclosed by JP Patent No. 4037199, the single bolt is tightened in the overlapping direction (also called as "stacked direction"), to collectively hold the multiplicity of contacts between the connecting terminals, which are the overlapped surfaces of the connecting terminals, and thereby fix the connecting terminals at the contacts therebetween, for electrical connections between the connecting terminals, respectively. This configuration disclosed by JP Patent No. 4037199 is effective in easily ensuring size reduction, compared to a technique disclosed by JP-A-2009-070754.

SUMMARY OF THE INVENTION

In the case where the connection structure disclosed by Japanese Patent No. 4037199 is applied to the connector disclosed by JP-A 2009-070754 in which the two terminal housings (the first terminal housing and the second terminal housing) are mated with each other, when the insulators and the first connecting terminals are accommodated in the first terminal housing on one side for example, the second connecting terminals corresponding to the first connecting terminals are necessarily accommodated in the second terminal housing on the other side.

In this context, there is a so-called "touch protect" technique for preventing a foreign object such as hand or finger from directly contacting to the connecting terminal (see for example, JP-A 2008-108675, JP-A 2000-3750). In the aforementioned connector, since the first connecting terminal side is sandwiched by the isolating member, there is a low possibility that the foreign object contacts to the first connecting terminals. On the other hand, since the insolating member is not accommodated in the second connecting terminal side, unlike the first connecting terminal side, the second connecting terminals are exposed to the outside.

It was necessary to apply the "touch protect" technique to the second connecting terminals that are exposed to the outside.

However, when the "tough protect" technique is simply applied to the second connecting terminals, there are disadvantages in that the insulators on the first connecting terminal side disturb the connection and in that the thickness in the stacked direction of the connector is increased despite the object of downsizing.

Accordingly, the object of the present invention is to provide a connector with a stacked structure, in which a plurality of first connecting terminals, a plurality of second connecting terminals and a plurality of insulators are alternately interleaved, for preventing both of the first connecting terminals and the second connecting terminals from contacting to the foreign object such as hand or finger.

According to a feature of the invention, a connector comprises:

a first terminal housing with a plurality of first connecting terminals aligned and accommodated therein;

a second terminal housing with a plurality of second connecting terminals aligned and accommodated therein, when the first terminal housing and the second terminal housing being mated with each other, one side of the first connecting terminals and one side of the second connecting terminals facing each other to form pairs and provide contacts, respectively, and resulting in a stacked structure of the pairs of the first connecting terminals and the second connecting terminals, in which each of the contacts is sandwiched by an insulator with a predetermined thickness;

a connecting member pressing the insulator adjacent thereto, to thereby collectively fix the first connecting terminals and the second connecting terminals at the contacts therebetween, for electrical connections between the first connecting terminals and the second connecting terminals, respectively;

in which the insulator comprises a first isolating member configured to be fixed to other side of an adjacent first connecting terminal and to cover at least one surface on a tip end side in mating direction of the adjacent first connecting terminal, and a second isolating member configured to be fixed to the other side of an adjacent second connecting terminal and to cover at least one surface on a tip end side in mating direction of the adjacent second connecting terminal, in which the insulator with the predetermined thickness is formed by overlapping the first insolating member and the second isolating member when the first terminal housing and the second terminal housing are mated with each other.

It is preferable that the first isolating member and the second isolating member are formed by dividing the insulator into two parts.

It is preferable that the second isolating member is integrally formed with the second terminal housing comprising an insulating material.

It is preferable that a first thickness of the second isolating member on a side of the second inner housing is thinner and constricted compared with a second thickness of the second isolating member on the tip end side in the mating direction.

It is preferable that the second inner housing is provided with a partition protruding to cover one surface of the second connecting terminal facing to an inner periphery surface of the second terminal housing without obstruct insertion of the first connecting terminal which forms a pair with the second connecting terminal, and the first isolating member fixed to the first connecting terminal of the pair is provided with a guide groove for guiding and bypassing the partition.

It is preferable that at least one of the first isolating member and the second isolating member is configured to cover the first connecting terminal or the second connecting terminal as a fixing object.

ADVANTAGES OF THE INVENTION

According to the invention, it is possible to prevent both of the first connecting terminals and the second connecting terminals from contacting to the foreign object such as hand and finger.

BRIEF DESCRIPTION OF THE DRAWINGS

The preferred embodiment according to the invention will be explained below referring to the drawings, wherein:

FIGS. 4A and 4B are explanatory diagrams showing a first connector portion, wherein

FIGS. 5A and 5B are explanatory diagrams showing a first connecting terminal, wherein

FIGS. 6A and 6B are explanatory diagrams showing a second connector portion, wherein

FIGS. 7A and 7B are explanatory diagrams showing a second connecting terminal, wherein

FIGS. 8A and 8B are explanatory diagrams showing a second connecting terminal, wherein

FIGS. 9A to 9D are explanatory diagrams showing the second connecting terminals accommodated in aligned state in a second inner housing, wherein

DETAILED DESCRIPTION OF THE PREFERRED EMBODIMENT

Next, preferred embodiment according to the present invention will be explained below in more detail in conjunction with appended drawings.

Firstly, a connector in an embodiment according to the present invention will be explained below.

Figure 1:
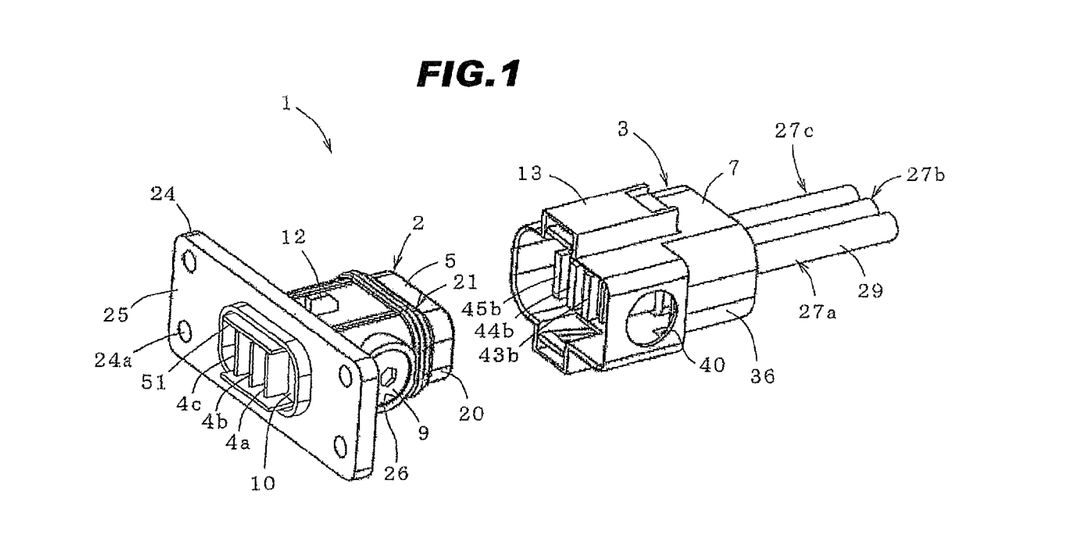
FIG. 1 is a perspective view showing a first connector portion and a second connector portion composing a connector in a first embodiment according to the present invention.
Figure 2:
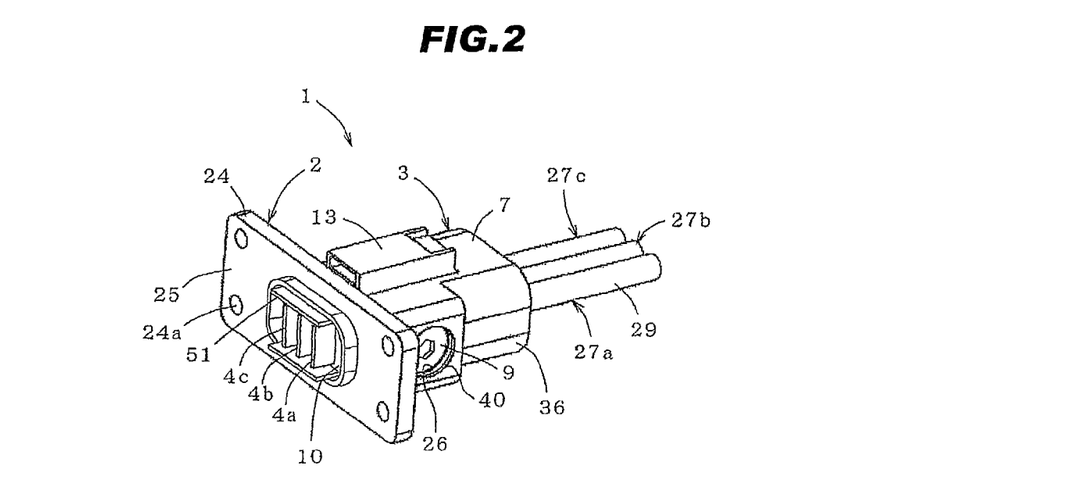
FIG. 2 is a perspective view showing the connector when the first connector portion and the second connector portion are mated.
Figure 3:
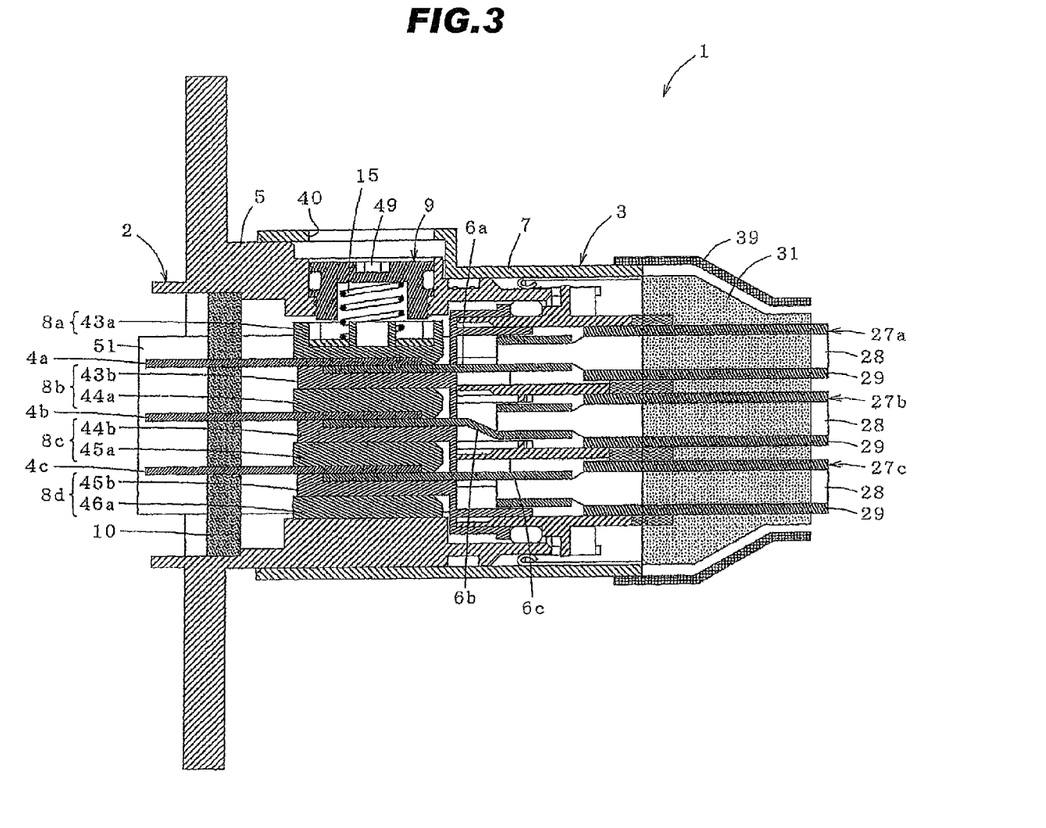
FIG. 3 is a cross sectional view of the connector when the first connector portion and the second connector portion are mated.

FIG. 1 is a perspective view showing a first connector portion 2 and a second connector portion 3 composing a connector 1 in the first embodiment according to the present invention. FIG. 2 is a perspective view showing the connector 1, when the first connector portion 2 and the second connector portion 3 are mated. FIG. 3 is a cross sectional view of the connector 1 when the first connector portion 2 and the second connector portion 3 are mated.

(The Connector 1 Structure)

As shown in FIGS. 1 to 3, the connector 1 in this embodiment comprises a first connector portion 2 and a second connector portion 3 mated with each other, to thereby collectively connect a plurality of power lines.

More specifically, the connector 1 includes the first connector portion 2 having a first terminal housing 5 with a plurality of (three) first connecting terminals (male terminals) 4a to 4c aligned and accommodated therein, the second connector portion 3 having a second terminal housing 7 with a plurality of (three) second connecting terminals (female terminals) 6a to 6c aligned and accommodated therein, a plurality of insulators 8a to 8d aligned and accommodated in the first terminal housing 5, and a connecting member 9 which collectively fixing the first connecting terminals 4a to 4c and the second connecting terminals 6a to 6c at respective contact points and electrically connects with each other by pressing the insulator 8a adjacent to the connecting member 9. When the first terminal housing 5 of the first connector portion 2 and the second terminal housing 7 of the second connector portion 3 are fitted to each other, the plural first connecting terminals 4a to 4c and the plural second connecting terminals 6a to 6c face each other to form pairs, respectively (i.e. each pair of the first connecting terminal 4a and the second connecting terminal 6a, the first connecting terminal 4b and the second connecting terminal 6b, and the first connecting terminal 4c and the second connecting terminal 6c), and result in a stacked structure of the pairs of the first connecting terminals 4a to 4c and the second connecting terminals 6a to 6c alternately interleaved at the respective contact points with the plural insulators 8a to 8d, each of which comprises a non-conductive resin with a predetermined thickness.

(Insulators 8a to 8d)

The insulators 8a to 8d comprises first isolating members 43a to 46a and second isolating member 43b to 45b that are bisected insulators, namely each insulator is divided into two parts. More precisely, in the present embodiment, the insulator 8a and the first isolating member 43a have the same thickness and that are not divided in two. However, the insulator 8a and the first isolating member 43a may have a divided thickness, similarly to the first isolating members 44a to 46a. In following explanation, the insulator 8a and the first isolating member 43a are explained as if they are divided.

Each of the first isolating members 43a to 46a is one of two bisected insulator formed by dividing each of the insulators 8a to 8d. For example, in the case where the first connecting terminal 4a (or 4b, 4c) is adjacent to one of the first isolating members 43a to 46a, this first isolating member is configured to be fixed to the other surface of the adjacent first connecting terminal 4a (or 4b, 4c) and cover at least a surface on a tip end side in the mating direction of the adjacent first connecting terminal 4a (or 4b, 4c). Herein, the first isolating member 46a, to which the first connecting terminal 4a (or 4b, 4c) is not adjacent, is integrally fixed to an inner surface of the first terminal housing 5.

Each of the second isolating members 43b to 45b is the other one of the bisected insulator. In the case where the first connecting terminal 6a (or 6b, 6c) is adjacent to one of the second isolating members 43b to 45b, this second isolating member is configured to be fixed to the other surface of the adjacent second connecting terminal 6a (or 6b, 6c) and cover at least a surface on a tip end side in the mating direction of the adjacent second connecting terminal 6a (or 6b, 6c).

A total thickness of the first isolating member 44a (or 45a, 46a, 43a) and the second isolating member 43b (or 44b, 45b) is set to a necessary and sufficient thickness for providing electrical isolation between contacts (or between a contact and the first terminal housing). In other words, it is possible to provide the electrical isolation between the contacts (or between the contact and the first terminal housing) for the first time, by overlapping the first isolating members 43a to 46a and the second isolating members 43b to 45b.

Herein, the insulator 8a pressed by the connecting member 9 is actually consisted of the first isolating member 43a. However, from the view point of the concept of the present invention, the insulator 8a is formed by overlapping the first isolating member 43a having a predetermined thickness with the second isolating member having a thickness of 0 (zero).

This connector 1 is used for connection of a vehicle drive motor and an inverter for diving that motor, for example.

More specifically, the first terminal housing 5 of the first connector portion 2 (in FIG. 1, left side portion) is mated with a shield case of the motor, and the first connecting terminal 4a to 4c portions exposed from the first terminal housing 5 are connected to terminals, respectively, of a terminal block installed in the shield case of the motor. Mating to this first connector portion 2 the second connector portion 3 electrically connected with the inverter results in electrical connection of the motor and the inverter. Although the foregoing is concerned with the motor side connection, the same applies to the inverter side connection.

(First and Second Connector Portions 2 and 3)

Below are described the respective specific structures of the first connector portion 2 and the second connector portion 3.

(First Connector Portion 2)

Figure 4A:
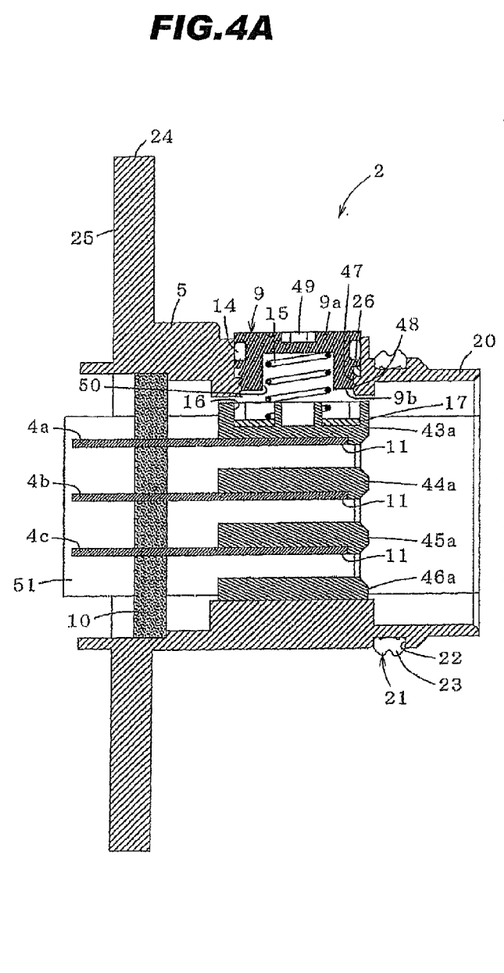
FIG. 4A is a cross sectional view thereof and FIG. 4B is a schematic diagram thereof viewed from a tip end in a mating direction.
Figure 4B:
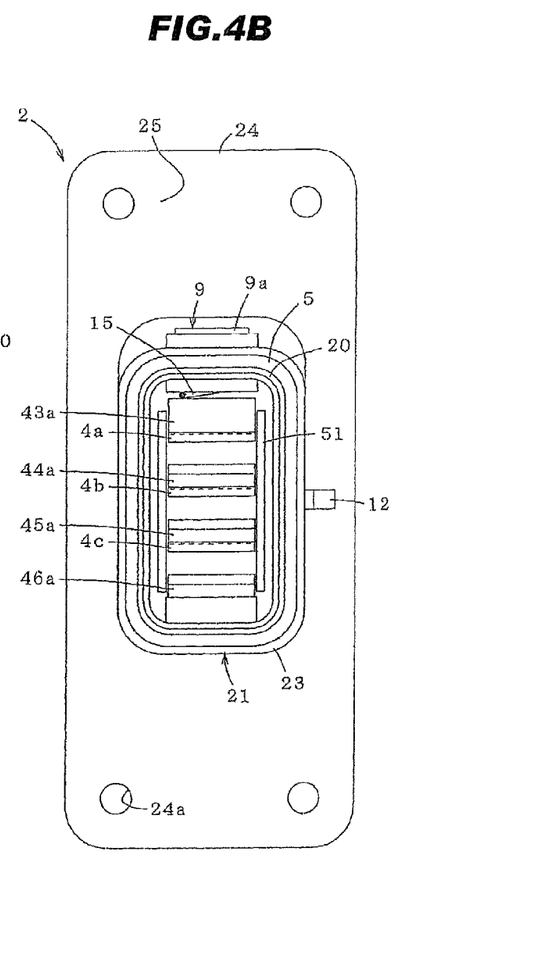

Referring to FIG. 4, the first connector portion 2 has the three first connecting terminals 4a to 4c held therein to be aligned at a specified pitch, and includes the first terminal housing 5 for accommodating the three aligned first connecting terminals 4a to 4c, and a connecting member 9 for collectively fixing the first connecting terminals 4a to 4c and the second connecting terminals 6a to 6c at the contacts therebetween, by pressing the adjacent insulator 8a.

The first terminal housing 5 may be a male housing (male side terminal housing) or a female housing (female side terminal housing). Herein, the case that the first terminal housing 5 is the male side terminal housing is explained as an example.

(First Connecting Terminals 4a to 4c)

The first connecting terminals 4a to 4c are plate terminals and are held to be aligned at a specified pitch by being spaced apart from each other in a first inner housing 10 accommodated in the first terminal housing 5. The first inner housing 10 comprises a molded resin material formed of a non-conductive resin (an insulating resin) (e.g. PPS (polyphenylene sulfide) resin, PPA (polyphthalamide) resin, PA (polyamide) resin, PBT (polybutylene terephthalate), epoxy based resin). As a method for holding the first connecting terminals 4a to 4c with the first inner housing 10, there is a holding method by inserting the first connecting terminals 4a to 4c during molding of the first inner housing 10 and then curing the resin, or a holding method by pressing the first connecting terminals 4a to 4c into the first inner housing 10 which has been molded beforehand.

Each of the first connecting terminals 4a to 4c is integrally fixed to each of the first isolating members 43a to 45a, which is disposed to be adjacent to the other surface side (i.e. to the opposite side to the side joined with the second connecting terminals 6a to 6c). In other words, as described above, the first inner housing 10 holds the first connecting terminals 4a to 4c to be spaced apart from each other and aligned at a specified pitch. Since the first isolating members 43a to 45a are integrally fixed to the tip end side of the first connecting terminals 4a to 4c, the first isolating members 43a to 45a are spaced apart from each other and aligned at a specified pitch as a result. According to this structure, the electrical isolation between the respective contacts and insertability of the second connecting terminals 6a to 6c at the time of mating are obtained.

In addition, it is not necessary for the first isolating members 43a to 45a to be fixed physically to the first connecting terminals 4a to 4c. It is enough if a location relationship between the first isolating members 43a to 45a and the first connecting terminals 4a to 4c is fixed. By way of example only, the first isolating members 43a to 45a may be formed integrally with the first inner housing 10, thereby fixing the location relationship between the first isolating members 43a to 45a and the first connecting terminal 4a to 4c. As thus described, it is possible to further reduce the number of parts, manufacturing process of the parts, and manufacturing cost, by forming the first isolating members 43a to 45a integrally with the first inner housing 10.

The first connecting terminals 4a to 4c are supplied with electricity at different voltages and/or currents, respectively. For example, in this embodiment, power lines are assumed to be for three phase alternating current between a motor and an inverter, so that the first connecting terminals 4a to 4c are supplied with alternating currents, respectively, which are 120 degrees out of phase with each other. For the purpose of reducing the loss of power transmitted through the connector 1, the first connecting terminals 4a to 4c may each be formed of a metal such as a high conductivity silver, copper, aluminum, or the like. Also, the first connecting terminals 4a to 4c each have slight flexibility.

The first isolating members 43a to 46a are fixed at such a position as to protrude from the tips of the first connecting terminals 4a to 4c. Each of these first isolating members 43a to 46a is chamfered at each of its corners on the second connecting terminal 6a to 6c inserting/removing side. Also, referring to FIGS. 5A and 5B, each of the first isolating members 43a to 46a is formed with a fitting groove 11 to which each of the first connecting terminals 4a to 4c is fitted.

Figure 5A:
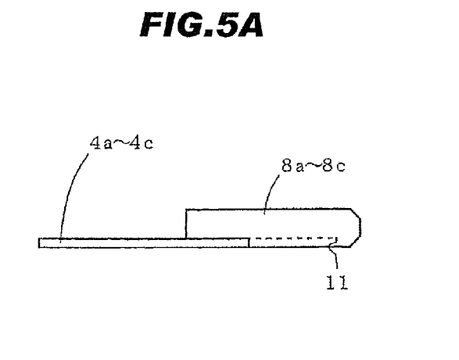
FIG. 5A is a side view thereof and FIG. 5B is a bottom view thereof.
Figure 5B:
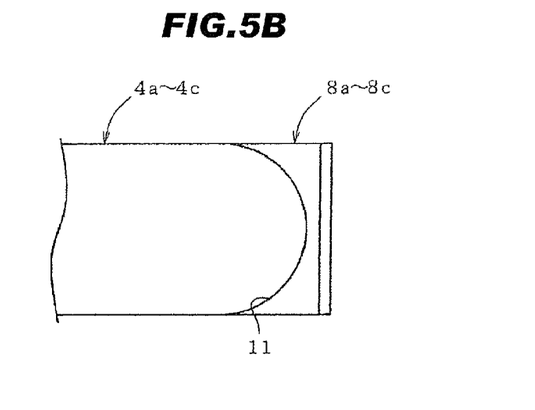

Each of the first connecting terminals 4a to 4c as fixing object is fitted into the fitting groove 11 and integrally fixed thereto. Accordingly, the level difference between the first isolating members 43a to 45a and the first connecting terminals 4a to 4c is filled, so that the lower surfaces (in the figure, the lower sides) of the first isolating members 43a to 45a are coplanar with the lower surfaces (in the figure, the lower sides) of the first connecting terminals 4a to 4c, respectively. With this configuration, when the first connector portion 2 and the second connector portion 3 are mated with each other, the insertability of the second connecting terminal 6a to 6c to the first connecting terminals 4a to 4c is therefore enhanced. In FIG. 5A, the structure of the first isolating member 43a is depicted as being simplified, and the first isolating members 43a to 45a are depicted likewise.

(Connecting Member 9)

Referring again to FIG. 4, the connecting member 9 is made of a metal (e.g. SUS, iron, copper alloy, or the like), and comprises a large diameter part 9a and a small diameter part 9b integrally formed with the large diameter part 9a.

The large diameter part 9a of the connecting member 9 is provided with a packing 14 therearound for preventing water from penetrating into the first terminal housing 5.

At an outer periphery surface of the small diameter part 9b, a male screw 48 is formed. The male screw 48 is configured to screw into a female screw 47 formed on an inner periphery surface of a connecting member insertion hole 26 of the first terminal housing 5. According to this structure, the connecting member 9 is configured to press the adjacent insulator 8a by screwing into the first terminal housing 5.

Also, the large diameter part 9a is provided with an irregular shape bore 49 (hexagonal bore in FIG. 4A) in its upper surface. It is possible to rotate and tighten the connecting member 9 by mating a tightening tool such as spanner into the irregular shape bore 49.

The connecting member 9s is configured to have two outer diameter dimensions, namely, the large diameter part 9a provided with a packing 14 and the small diameter part 9b formed with the male screw 48. The connecting member insertion hole 26 is configured to match with the shape of the connecting member 9 having those two outer diameter dimensions. With this configuration, when the connecting member 9 is tightened into the connecting member insertion hole 26, the male screw 48 is not disposed in a portion facing the packing 14. This can therefore ensure its effective waterproofing structure.

Also, the connecting member 9 is formed with a hollow portion 50 which is opened inside the first terminal housing 5. The elastic member 15 for applying a specified pressing force to the insulator 8a is accommodated in the hollow portion 50. The elastic member 15 comprises, e.g. a spring made of a metal (e.g. SUS, or the like). In this embodiment, the elastic member 15 constitutes a portion of the connecting member 9.

The insulator 8a to be in contact with a portion of the elastic member 15 is formed with a recessed portion 16 in its upper surface which covers (accommodates) the portion of the elastic member 15. At the bottom of the recessed portion 16 (i.e. the base to be in contact with the lower portion of the elastic member 15) is provided a receiving member 17 made of a metal (e.g. SUS, or the like) which receives the elastic member 15 and which is for preventing damage to the insulator 8a formed of an insulating resin.

The receiving member 17 prevents the insulator 8a from being damaged by dispersing the stress applied to the upper surface of the insulator 8a from the elastic member 15. Therefore, it is preferable to increase a contact area between the receiving member 17 and the insulator 8a as much as possible. In the present embodiment, the receiving member is configured to contact entirely a bottom surface of the recessed portion 16, so as to increase the contact area between the receiving member 17 and the insulator 8a.

This connecting member 9 is inserted into the first terminal housing 5 from above the first connecting terminal 4a to 4c surfaces (in FIG. 4, the upper surfaces) to which are fixed the first isolating members 43a to 45a, respectively. A male screw 48 formed at the small diameter part 9b is then screwed into the female screw 47 formed at the first terminal housing 5, to thereby allow the connecting member 9 to press the first connecting terminals 4a to 4c and the second connecting terminals 6a to 6c toward the insertion direction of the connecting member 8 (in FIG. 4, downward from above), and collectively fix the first connecting terminals 4a to 4c and the second connecting terminals 6a to 6c at the contacts therebetween, for electrical connections between the first connecting terminals 4a to 4c and the second connecting terminals 6a to 6c, respectively.

(First Terminal Housing 5)

The first terminal housing 5 is formed of a cylindrical hollow body 20 which is substantially rectangular in transverse cross section. An outer periphery portion at one end (in the figure, at the right end) of the cylindrical body 20 mated with the second terminal housing 7 is formed in a tapered shape, taking the mateability with the second connector portion 3 into consideration. Further, the outer periphery portion of the cylindrical body 20 is provided with a rib 12 for keeping the mating direction with the second terminal housing constant when mated, and for fixing and stabilizing the mated state. Also, in the outer periphery portion at one end of the cylindrical body 20 is provided a terminal housing waterproofing structure 21 for sealing between the first connector portion 2 and the second connector portion 3. The terminal housing waterproofing structure 21 is formed of a recessed portion 22 formed in an outer portion at the open end of the cylindrical body 20, and a packing 23 provided in the recessed portion 22, such as an O-ring.

In the other end (in the figure, in the left end) of the cylindrical body 20 is accommodated the first inner housing 10 with the first connecting terminals 4a to 4c aligned and held therewith. In an outer portion at the other end of the cylindrical body 20 is formed a flange 24 for fixing the first connector portion 2 to a device casing (e.g. a motor shield case). At a rim 25 of the flange 24 having an attachment hole 24a for bolt insertion and fixation to a device casing may be provided a packing for sealing between the first connector portion 2 and the device casing. The structure of this flange 24 is not assumed as fixing the first connector portion 2 to a device casing, but the flange 24 may be provided in the second connector portion 3, or in both the first connector portion 2 and the second connector portion 3. Also, both of the first connector portion 2 and the second connector portion 3 may be free or not fixed to a device casing.

Also, this flange 24 is effective in enhancing the dissipation of heat. That is, the formation of the flange 24 permits a large surface area of the first terminal housing 5, thereby allowing enhancement in the heat dissipation to outside via the first terminal housing 5, of heat produced inside the first connector portion 2 (e.g. heat produced at each contact).

In an upper portion (in the figure, in the upper side) of the cylindrical body 20 is formed a connecting member insertion hole 26 for inserting the connecting member 9. The connecting member insertion hole 26 is formed in a cylindrical shape, and reduced in diameter (bent inward) at a lower end (in the figure, at the lower side) of that cylindrical shape in accordance with the shape of the connecting member 9. A rim of the lower surface of the large diameter part 9a of the connecting member 9 is contacted with this bent portion of the connecting member insertion hole 26, to thereby regulate the stroke of the connecting member 9.

For shielding performance, heat dissipation, and weight reduction of the connector 1, the cylindrical body 20 is formed of, preferably a high electrical conductivity, high thermal conductivity and lightweight metal such as an aluminum, but may be formed of a resin, or the like. In the case that the first terminal housing 5 is formed of an insulating resin, the first isolating member 46a and the first terminal housing 5 may integrally be formed of the insulating resin. In the present embodiment, the cylindrical body 20 is formed of aluminum. The cylindrical body 20 formed of an aluminum as mentioned above allows the connecting member 9 to be firmly tightened into the connecting member insertion hole 26 when screwed thereinto, compared with the cylindrical body 20 formed of an insulating resin.

In the present embodiment, a clearance between the stacked structure and the first terminal housing 5 is designed to be as small as possible for downsizing the connector 1. Therefore, it is necessary to ensure the electrical isolation between the first terminal housing 5 and the first connecting terminals 4a to 4c, in order to prevent the first connecting terminals 4a to 4c from electrical short-circuit via the first terminal housing 5 made of metal.

Therefore, in the present embodiment, electric shield plates 51 are provided at both sides of the first inner housing 10 which holds and aligns the first connecting terminals 4a to 4c. This electric shield plate 51 is formed by integral molding with the first inner housing 10.

The electric shield plate 51 also has a function of "touch protect" for preventing that a foreign material such as hand or a finger touches a side surface of the first connecting terminals 4a to 4c, in addition to the effect of retention of the electrical isolation. In other words, the electric shield plate 51 has the effect of providing the electrical isolation between the first terminal housing 5 and the first connecting terminals 4a to 4c when the clearance is small, and the effect of preventing that the hand or finger touches the side surface of the first connecting terminals 4a to 4c before mating in addition to the electrical isolation, when the clearance between the stacked structure and the first terminal housing 5 is large enough that the hand or finger can enter into the clearance.

Further, instead of the electric shield plate 51, the first isolating members 43a to 45a may be formed to cover the side surfaces of the first connecting terminals 4a to 4c.

In addition, it is assumed that a proportion of adult males in total of operators operating the connector is high. Therefore, in the present embodiment, size of a hand or finger of an adult male is thought as a reference of size of the hand or finger of the operator. However, this reference is naturally changed appropriately in accordance with the expected operator.

(Second Connector Portion 3)

Figure 6A:
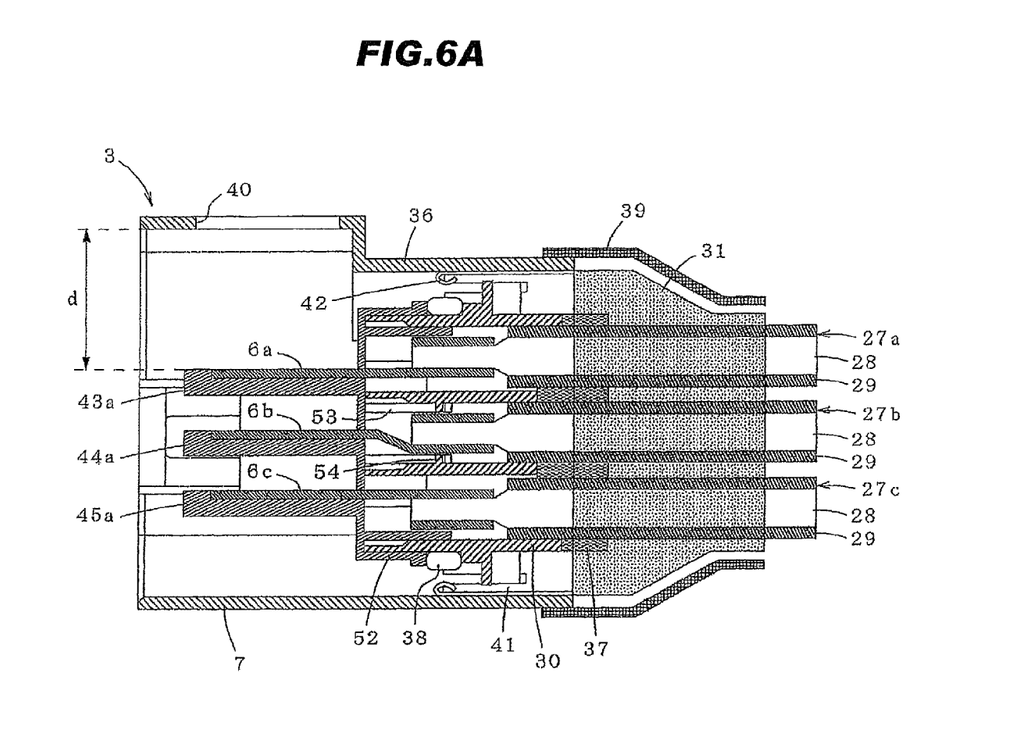
FIG. 6A is a cross sectional view thereof and FIG. 6B is a schematic diagram thereof viewed from a tip end in a mating direction.
Figure 6B:
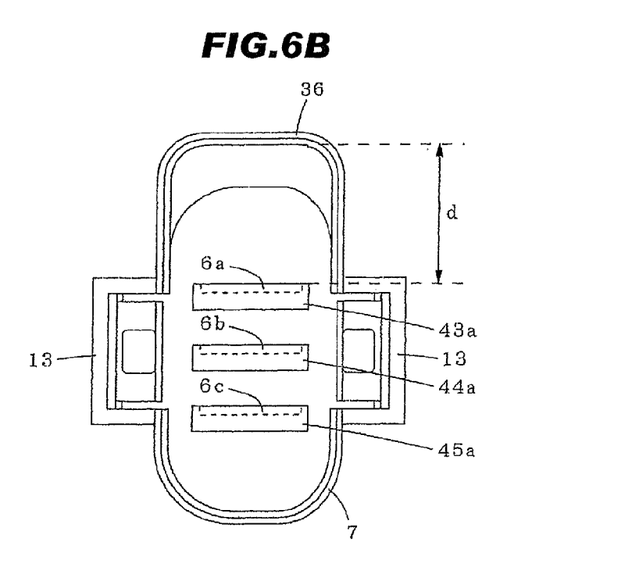

Referring to FIG. 6, the second connector portion 3 has the second terminal housing 7 with a plurality of (three) second connecting terminals (female terminals) 6a to 6c aligned and accommodated therein. Herein, a connector portion on the female terminal side is called as "second connector portion 3". The second terminal housing 7 may be a male housing (male side terminal housing) or a female housing (female side terminal housing). Herein, the case that the second terminal housing 7 is the female side terminal housing is explained as an example.

(Second Connecting Terminals 6a to 6c)

Figure 7A:
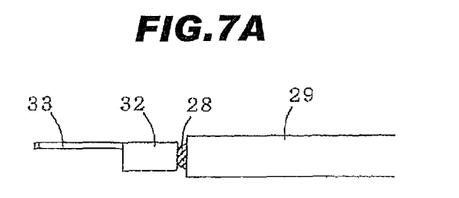
FIG. 7A is a side view thereof and FIG. 7B is a bottom view thereof.
Figure 7B:
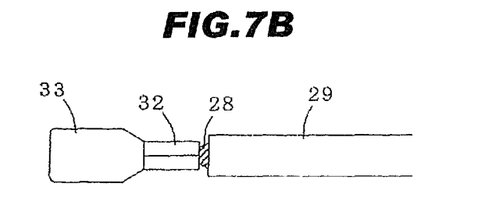
Figure 8A:
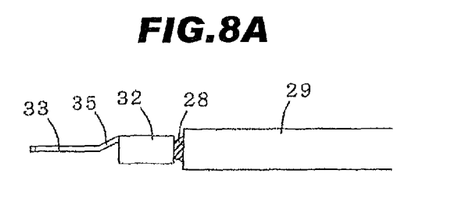
FIG. 8A is a side view thereof and FIG. 8B is a bottom view thereof.
Figure 8B:
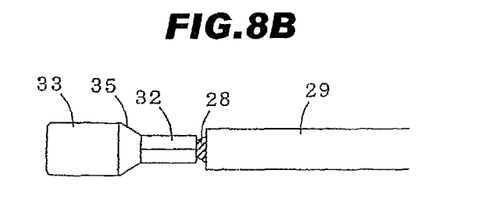
Figure 9A:
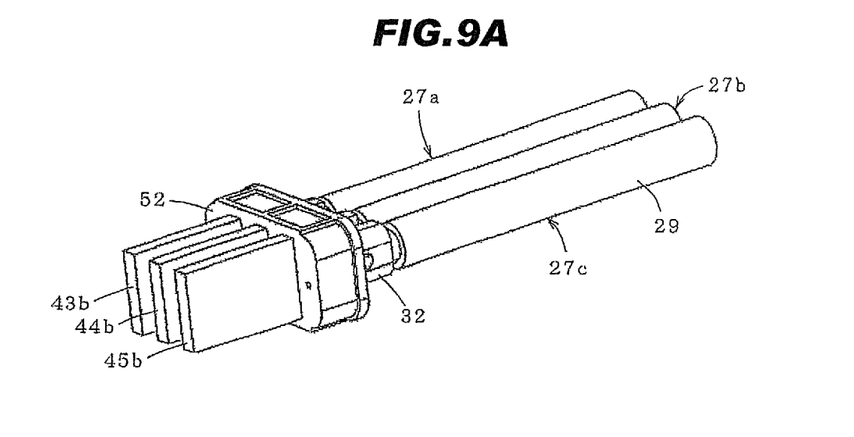
FIG. 9A is a perspective view thereof.
Figure 9B:
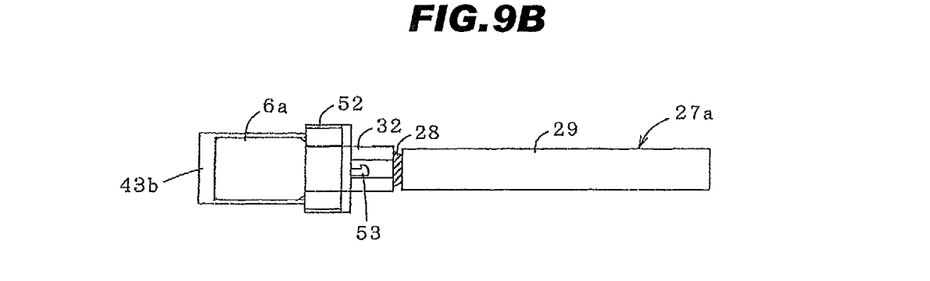
FIG. 9B is a top plan view thereof and FIG. 9C is a bottom view thereof and FIG. 9D is a side view thereof.
Figure 9C:
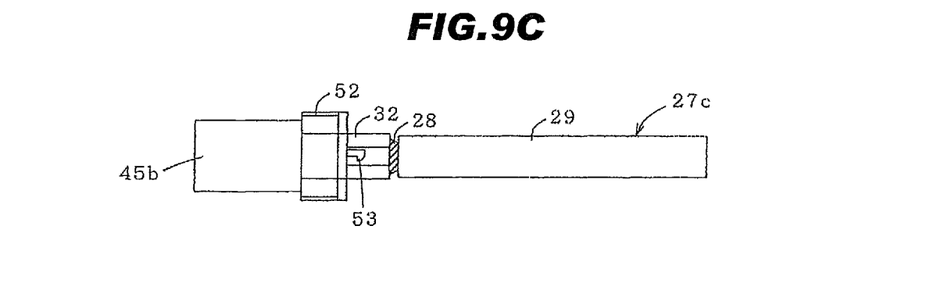
Figure 9D:
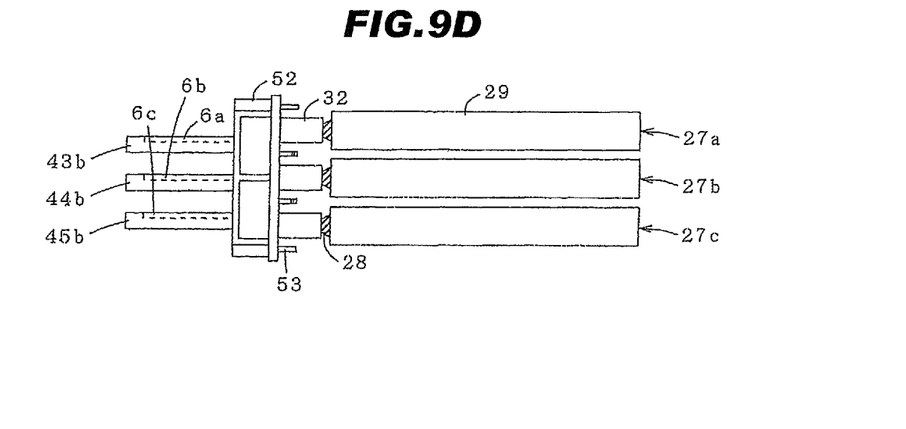

Referring to FIGS. 7 and 8, the second connecting terminals 6a to 6c respectively include calking portions 32 for calking the conductors 28 exposed from the tips of the cables 27a to 27c, and plate-like contacts 33 formed integrally with the calking portions 32. At tips of the plate-like contacts 33 are respectively formed tapered portions to enhance the insertability of the tape-like contacts 33.

In this embodiment, to reduce the size of the connector 1, the cables 27a to 27c are configured to be aligned and held as close to each other as possible. To this end, as shown in FIG. 8, a trunk 35 of the second connecting terminal 6b to be connected to the cable 27b arranged in the middle when aligned is bent, to thereby space the second connecting terminals 6a to 6c apart at the same pitch.

The second connecting terminals 6a to 6c may each be constructed of a high electrical conductivity metal such as silver, copper, aluminum, or the like, in order to reduce the loss of power transmitted through the connector 1. Also, the second connecting terminals 6a to 6c each have slight flexibility.

The second connecting terminals 6a to 6c are connected with cables 27a to 27c, respectively, at one end, which extend from an inverter. These cables 27a to 27c are electrically connected to the first connecting terminals 4a to 4c via the second connecting terminals 6a to 6c, respectively, and therefore supplied with electricity at voltages and/or currents in correspondence to the second connecting terminals 6a to 6c, respectively. The cables 27a to 27c are constructed by forming an insulating layer 29 around a conductor 28. In this embodiment, the conductor 28 used has a cross section of 20 mm$^2$.

The cables 27a to 27c are held to be aligned at a specified pitch by a multi-cylindrical (i.e. plurality of cylinders are aligned) cable holding member 30. The cable holding member 30 is formed of an insulating resin, to isolate the second connecting terminals 6a to 6c from each other to prevent a short circuit. This cable holding member 30 allows the second connecting terminals 6a to 6c to be held at specified positions respectively, even when the cables 27a to 27c respectively connected to the second connecting terminals 6a to 6c have excellent flexibility. That is, in this embodiment, the cables 27a to 27c to be used can have excellent flexibility, and therefore enhance a degree of freedom of wiring the cables 27a to 27c.

Referring to FIG. 9, a second inner housing 52 is mated to the tip end side of the mating direction of the cable holding member 30. The second inner housing 52 comprises a molded resin material in which the second connecting terminals 6a to 6c that are held to be aligned at a specified pitch by being spaced apart from each other. With this second inner housing 52, when the first connector portion 2 and the second connector portion 3 are mated with each other, the second connecting terminals 6a to 6c are held to be positioned below the first connecting terminals 4a to 4c to face (i.e. to be connected to) the second connecting terminals 6a to 6c to form pairs respectively.

As a method for holding the second connecting terminals 6a to 6c with the second inner housing 52, there is a holding method by insert molding similar to the method for holding the first connecting terminals 4a to 4c with the first inner housing 10.

However, the second connecting terminals 6a to 6c are connected to lengthy cables 27a to 27c unlike the first connecting terminals 4a to 4c. Therefore, if the method for holding the second connecting terminals 6a to 6c by the insert molding is adopted, the second inner housing 52 should be inserted from rear ends of the cables 27a to 27c when the second inner housing 52 is mated to the cable holding member 30, which necessitates a troublesome operation.

Accordingly, in the present embodiment, tips of the cables 27a to 27c are inserted into the cable holding member 30 to be held by the cable holding member 30. Thereafter, the second inner housing 52 molded with a cap-like shape is mated to the cable holding member 30 to cover the second connecting terminals 6a to 6c, thereby holding the second connecting terminals 6a to 6c to be aligned.

Further, the second inner housing 52 is provided with a claw 53 which is configured to be engaged with the cable holding member 30. This claw 53 engages an engaging part 54 formed at the cable holding member 30, so that the second inner housing 52 is fixed to the cable holding member 30 after mating.

The second inner housing 52 comprises a non-conductive resin (insulating resin) or the like, so as to electrically isolate the second connecting terminals 6a to 6c from each other, thereby preventing the short-circuit.

Each of the second connecting terminals 6a to 6c is integrally fixed to each of the second isolating members 43b to 45b, which is disposed to be adjacent to the other surface side (i.e. to the opposite side to the side joined with the first connecting terminals 4a to 4c). Herein, the term "being fixed" means that a location relationship between the second isolating members 43b to 45b and the second connecting terminals 6a to 6c is fixed as described above. In the present embodiment, the second isolating members 43b to 45b are integrally formed with the second inner housing 52. According to this structure, it is possible to reduce the manufacturing cost.

Figure 10:
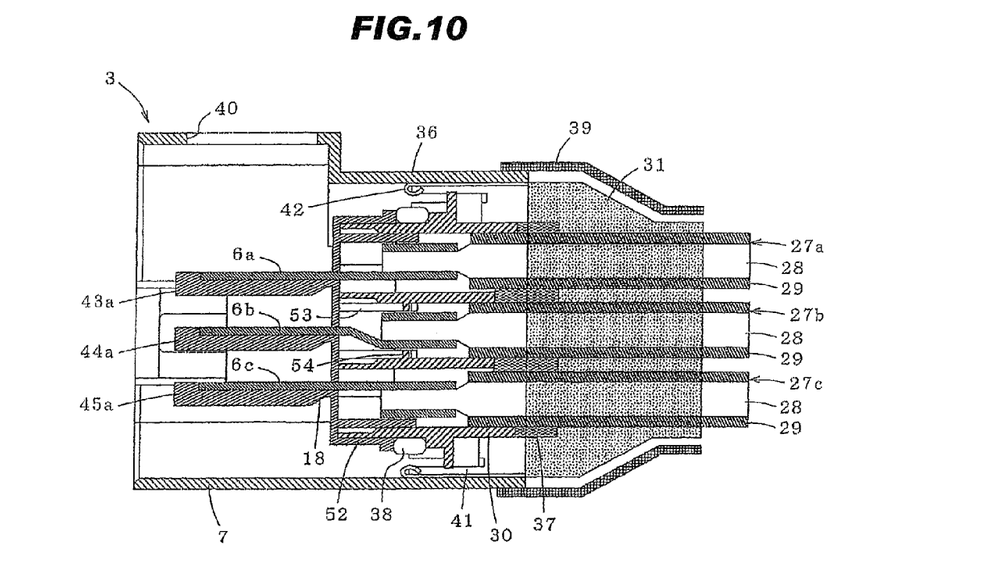
FIG. 10 is a cross sectional view of a second connector portion in a variation of the embodiment according to the invention.

When the second isolating members 43b to 45b are integrally formed with the second inner housing 52 as described above, the second connecting terminals 6a to 6c may be held too tightly by the second the second isolating members 43b to 45b and the second inner housing 52, so that the flexibility of the second connecting terminals 6a to 6c may be deteriorated. However, in such a case, as shown in FIG. 10, it is preferable to form the second connecting terminals 43b to 45b with a constricted part 18 such that a thickness thereof on a side of the second inner housing 52 is thinner and constricted compared with a thickness thereof on a side of the tip in the mating direction. According to this structure, it is possible to enhance a good insertability without deteriorating the flexibility of the second connecting terminals 6a to 6c. More concretely, the first connecting terminals 4a to 4c are deformed by pressure of the connecting member 9 in the first connector portion 2, so that the flexibility can be provided even though the insertion position of the second connecting terminals 6a to 6c is slightly changed.

Still further, the second isolating members 43b to 45b are formed to cover side surfaces of the second connecting terminals 6a to 6c as well as surface at the tip end side in the mating direction of the second connecting terminals 6a to 6c. According to this structure, it is possible to ensure the electrical isolation between the second connecting terminals 6a to 6c and the first terminal housing 5 made of metal when the first terminal housing 5 is mated to the second terminal housing 7. Further, it is possible to provide the effect of the "touch protect" similarly to the electric shield plate 51 by covering the side surface of the second connecting terminals 6a to 6c.

Also, a braided shield 31 is wrapped around cables 27a to 27c portions drawn out of the second terminal housing 7, for the purpose of enhancement in shielding performance. This braided shield 31 is contacted with a later-described cylindrical shield body 41, and electrically connected to the first terminal housing 5 (to be equipotential (GND)) through the cylindrical shield body 41. In FIGS. 1 and 2, the braided shield 31 is not shown for the purpose of simplification.

(Second Terminal Housing 7)

Referring again to FIG. 6, the second terminal housing 7 is formed of a cylindrical hollow body 36 which is substantially rectangular in transverse cross section. To mate the first terminal housing 5 into the second terminal housing 7, an inner portion at one end (in the figure, at the left end) of the cylindrical body 36 mated with the first terminal housing 5 is formed in a tapered shape, taking the mateability with the first terminal housing 5 into consideration. The outer periphery portion of the cylindrical body 36 is formed with a guide fixing part 13 for guiding and fixing the mating, by accommodating the rib 12 formed at the cylindrical body 20 composing the first terminal housing 5. The first terminal housing 5 is accommodated into the second terminal housing 7 and fixed thereinto, by guiding the rib 12 by the guide fixing part 13. According to this structure, it is possible to perform smooth mating and to tightly fix the first terminal housing 5 after mating, thereby preventing loosening of the mating due to the vibration.

Alternatively, the first terminal housing 5 and the second terminal housing 7 may be configured such that the second terminal housing 7 is mated into the first terminal housing 5, contrary to the above case. In this case, an inner portion at one end of the cylindrical body 20 composing the first terminal housing 5 may be formed in a tapered shape, an outer portion at one end of the cylindrical body 36 composing the second terminal housing 7 may be formed in a tapered shape, and the housing waterproof structure 21 may be formed around the outer portion at the one end of the cylindrical body 36.

In the other end (in the figure, in the right end) of the cylindrical body 36 is accommodated the cable holding member 30 with the cables 27a to 27c aligned and held therewith. On a cable insertion side of the cable holding member 30 is formed a packingless sealing portion 37, to prevent water from penetrating onto the cables 27a to 27c and into the second terminal housing 7. In an outer periphery portion of the cable holding member 30 and between the second inner housing 52, a packing 38 is provided to be in contact with an inner surface of the first terminal housing 5. That is, the connector 1 has a double waterproofing structure of the packing 23 of the terminal housing waterproofing structure 21 and the packing 38 provided in the outer portion of the cable holding member 30.

Further, the other end of the cylindrical body 36 from which the cables 27a to 27c are drawn out is covered with a rubber boot 39 for preventing water from penetrating into the cylindrical body 36. In FIGS. 1 and 2, the rubber boot 39 is not shown for the purpose of simplification.

Also, in an upper portion (in the figure, in the upper side) of the cylindrical body 36 is formed a connecting member manipulation hole 40 for manipulating the connecting member 9 provided in the first connector portion 2 when the first connector portion 2 and the second connector portion 3 are mated with each other. This connecting member manipulation hole 40 also serves as a through-hole for making the connecting member 9 insertable into and removable from the first terminal housing 5 after mating the first terminal housing 5 to the second terminal housing 7. According to this function as the through-hole of the connecting member manipulation hole 40, it is possible to facilitate assembling of the connector 1.

For shielding performance, heat dissipation, and weight reduction of the connector 1, the cylindrical body 36 is formed of, preferably a high electrical conductivity, high thermal conductivity and lightweight metal such as an aluminum, but may be formed of a resin, or the like. In this embodiment, the cylindrical body 36 is formed of an insulating resin.

Therefore, to enhance its shielding performance and heat dissipation, the cylindrical shield body 41 made of aluminum is provided on an inner surface at the other end of the cylindrical body 36.

The cylindrical shield body 41 has a contact 42 to be contacted with an outer portion of the first terminal housing 5 made of aluminum when the first connector portion 2 and the second connector portion 3 are mated with each other. The cylindrical shield body 41 is thermally and electrically connected with the first terminal housing 5 via this contact 42.

This enhances the shielding performance and the heat dissipation. In particular, the heat dissipation is likely to be significantly enhanced by positively allowing heat to escape toward the first terminal housing 5 having an excellent heat dissipation property.

(Connection Between the First Connecting Terminals 4a to 4c and the Second Connecting Terminals 6a to 6c)

Next is described the connection between the first connecting terminals 4a to 4c and the second connecting terminals 6a to 6c using the connector 1 in this embodiment.

When the first connector portion 2 and the second connector portion 3 are mated with each other from an unmated state as shown, the second connecting terminals 6a to 6c and the second isolating members 43b to 45b are inserted between the first connecting terminals 4a to 4c and the first isolating members 43a to 46a, where the second connecting terminals 6a to 6c and the second isolating members 43b to 45b and the first connecting terminals 4a to 4c and the first isolating members 43a to 46a form pairs respectively. With that insertion, the first connecting terminals 4a to 4c and the second connecting terminals 6a to 6c then face each other to form pairs, respectively, and result in a stacked structure in which the pairs of the first connecting terminals 4a to 4c, the second connecting terminals 6a to 6c and the insulators 8a to 8d composed by overlapping the first isolating members 43a to 46a and the second isolating members 43b to 45b are disposed alternately.

In this case, inside the first connector portion 2, the first isolating members 43a to 45a and the second isolating members 43b to 45b composing the insulators 8a to 8c are respectively fixed to the tips of the first connecting terminals 4a to 4c and the second connecting terminals 6a to 6c held to be aligned at a specified pitch as well as the inside of the first terminal housing 5. A pitch between the insulators 8a, 8b and 8c can therefore be held, even without separately providing a holding jig for holding the pitch between the insulators 8a, 8b and 8c. This allows the second connecting terminals 6a to 6c and the second isolating members 43b to 45b to be easily inserted between the first connecting terminals 4a to 4c and the first isolating members 43a to 46a, respectively, where the first connecting terminals 4a to 4c and the first isolating members 43a to 46a form the pairs with the second connecting terminals 6a to 6c and the second isolating members 43b to 45b respectively. That is, the insertability/removability of the second connecting terminals 6a to 6c is unlikely to deteriorate. Also, because of no need to provide a holding jig for holding the pitch between the insulators 8a, 8b and 8c, a further size reduction can very effectively be achieved, compared to the prior art.

Also, the contact between the first connecting terminal 4a (or 4b) and the second connecting terminal 6a (or 6b) is sandwiched between the first insulator 8a (or 8b) fixed to the first connecting terminal 4a (or 4b) constituting the contact, and the first insulator 8b (or 8c) fixed to the first connecting terminal 4b (or 4c) constituting the other contact. Likewise, the contact between the first connecting terminal 4c and the second connecting terminal 6c is sandwiched between the first insulator 8c fixed to the first connecting terminal 4c constituting the contact, and the second insulator 8d fixed to the inner surface of the first terminal housing 5.

Referring to FIG. 3, following that, the connecting member 9 is manipulated through the connecting member manipulation hole 40, to screw and tighten the male screw 48 of the connecting member 9 into the female screw 47 of the first terminal housing 5. The connecting member 9 is then rotated and pressed into the first terminal housing 5, and causes the elastic member 15 to, in turn, press the insulators 8a, 8b, 8c, and 8d, and sandwich the contacts between the insulators 8a and 8b, between the insulators 8b and 8c, and between the insulators 8c and 8d, respectively, with the contacts isolated from each other. In this case, by being pressed by the insulators 8c and 8d, the first connecting terminals 4a to 4c and the second connecting terminals 6a to 6c are slightly bent and contacted with each other, respectively, in a wide range. This allows each contact to be firmly contacted and fixed, even in a vibrational environment such as on vehicle.

As described above, in the connector 1 in the present embodiment, each of the insulators 8a to 8d for isolating each contact comprises bisected insulators, namely, the first isolating members 43a to 46a and the second isolating members 43b to 45b. The first isolating members 43a to 45a and the second isolating members 43b to 45b are fixed to the other surfaces of the first connecting terminal 4a to 4c and the second connecting terminal 6a to 6c, respectively. Therefore, as well as the first connecting terminal 4a to 4c, the second connecting terminal 6a to 6c are not exposed to the outside before mating, so that it is possible to prevent that the foreign materials such as hand or finger of the operator touches carelessly the second connecting terminals 6a to 6c and being shocked by the electric current.

Further, in the connector 1 in the present embodiment, the insulators 8a to 8d having a predetermined thickness are formed, since the first isolating member 43a to 45a overlap the second isolating member 43b to 45b, respectively, when the first terminal housing 5 and the second terminal housing are mated with each other. Namely, the insulators 8a to 8d are formed to have a necessary and sufficient thickness for isolating between the respective terminals, or between each terminal and the first terminal housing 5. Therefore, a thickness of the stacked structure comprising the respective contacts and the insulators 8a to 8d in a stacked direction will not be increased carelessly.

Still further, in the present embodiment, the thickness of the first isolating members 43a to 46a and the thickness of the second isolating members 43b to 45b are substantially the same. However, the invention is not limited thereto. The thickness of the first isolating members 43a to 46a and the thickness of the second isolating members 43b to 45b may be different from each other. Namely, for example, the second isolating members 43b to 45b may be formed thinner than the first isolating members 43a to 46a, to enhance the flexibility of the second connecting terminal 6a to 6c to which the second isolating members 43b to 45b are fixed.

As shown in FIG. 6, in the case where a distance d between one surface of the second connecting terminal 6a located on a top in FIG. 6 and an inner periphery surface of the second terminal housing 7 provided above the second connecting terminal 6a is configured in the dimensions that the foreign material such as hand or finger may enter thereinto, the one surface of the second connecting terminal 6a is exposed for connection with the first connecting terminal 4a before mating. Therefore, the hand or finger may touch this exposed surface and the operator may get shocked by the electric current.

Figure 11:
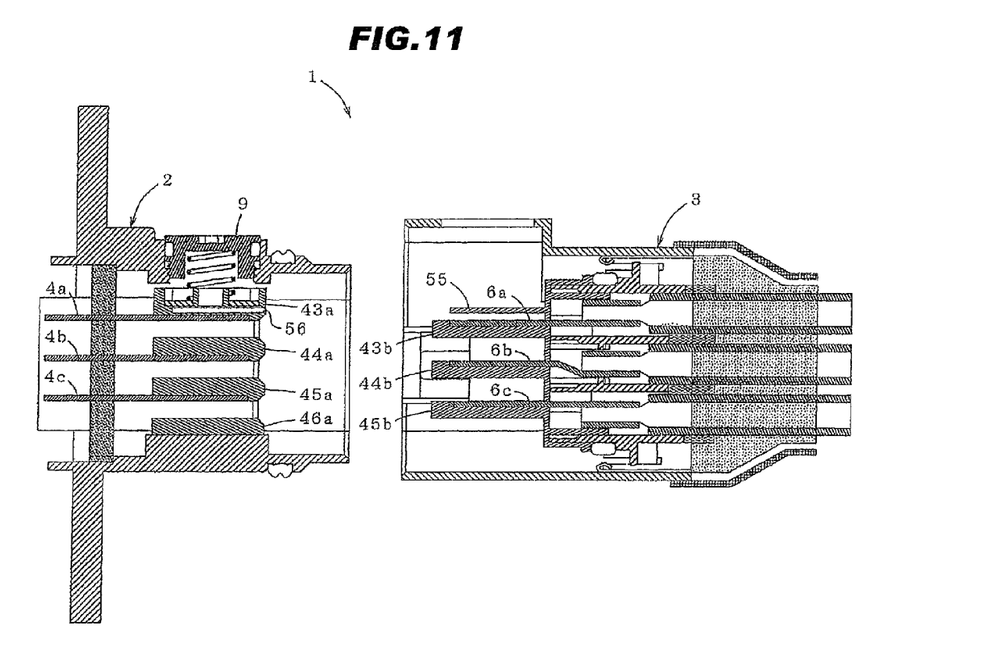
FIG. 11 shows cross sectional views of the first connector portion and the second connector portion of the connector in the variation of the embodiment according to the invention.

In such instances, as shown in FIG. 11, it is preferable to form a partition 55, which protrudes to cover the one surface of the second connecting terminal 6a without obstruct insertion of the first connecting terminal 4a, integrally with the second inner housing 52, and a guide groove 56 for guiding and bypassing the partition 55 toward the first isolating member 43a fixed to the first connecting terminal 4a, to which the partition 55 abuts when mated with each other. According to this structure, all of the connecting terminals are provided with the "touch protect".

In addition, the one surface of each connecting terminal is necessarily exposed (bared) for the connection. Therefore, when the alignment pitch of each connecting terminal is wide, there is a possibility that the hand or finger touches this exposed surface and the operator get shocked by the electric current.

Figure 12:
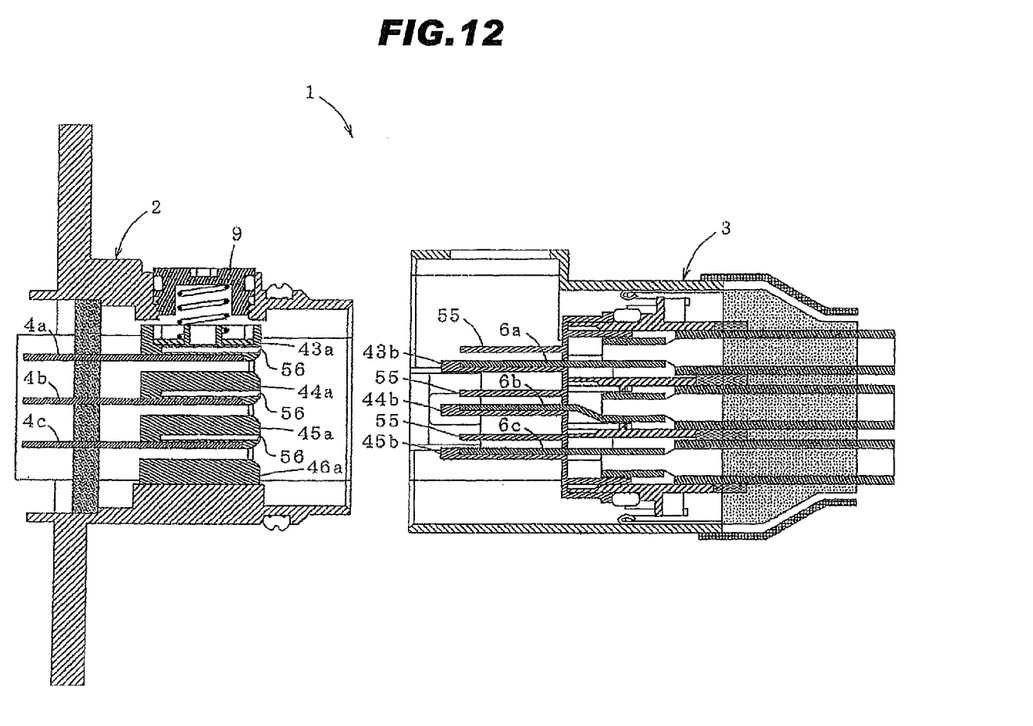
FIG. 12 shows cross sectional views of the first connector portion and the second connector portion of the connector in another variation of the embodiment according to the invention.

In such instances, as shown in FIG. 12, it is preferable to provide the first connecting terminals 4a to 4c with the "touch protect" by forming the first isolating members 43a to 45a to have a sufficient thickness, and to form the partition 55, which covers the one surface of each of the second connecting terminals 6a to 6c. In this case, each of the first isolating members 43a to 45a is formed with the guide groove 56 for guiding and bypassing the partition 55. Alternatively, the partition 55 may be formed to cover the one surface of each of all connecting terminals.

The invention is not limited to the above-described embodiments, but various alterations are possible in the scope not departing from the gist of the invention.

Also, although in this embodiment, three phase alternating power lines have been assumed, according to the technical idea of the invention, the connector for a vehicle, for example, may be configured to collectively connect lines for different uses, such as three phase alternating current power lines for between a motor and an inverter, two phase direct current power lines for an air conditioner, and the like. This configuration allows power lines for a plurality of uses to be collectively connected by one connector. There is therefore no need to prepare a different connector for each use, to thereby allow a contribution to space saving or low cost.

Also, although in this embodiment, the first connecting terminals 4a to 4c and the second connecting terminals 6a to 6c are in surface contact with each other respectively, the first connecting terminal 4a to 4c contact side surfaces to be contacted with the second connecting terminals 6a to 6c may be formed with protruding portions, and the plate-like contacts 33 of the second connecting terminals 6a to 6c may be configured to be mated onto these protruding portions, respectively. This configuration allows the further stabilization of the coupling force of the first connecting terminals 4a to 4c and the second connecting terminals 6a to 6c, respectively. That is, this configuration is especially effective for vibration perpendicular to the connecting member 9.

Also, the terminal surfaces of the first connecting terminals 4a to 4c and the second connecting terminals 6a to 6c may be knurled to make their frictional force large, so that the terminals are thereby unlikely to move relative to each other, and are firmly fixed at the contacts therebetween respectively.

Also, although in this embodiment, when viewed from the large diameter part 9a of the connecting member 9, the first connecting terminals 4a to 4c and the second connecting terminals 6a to 6c have been configured to be linearly contacted with each other respectively, the first terminal housing 5 and the second terminal housing 7 may be configured so that, when viewed from the large diameter part 9a of the connecting member 9, the first connecting terminals 4a to 4c of the first connector portion 2 cross and contact the second connecting terminals 6a to 6c of the second connector portion 3 respectively at a right angle thereto. That is, the first connector portion 2 and the second connector portion 3 may be mated with each other in an L-shape. Likewise, the second terminal housing 7 and the second connecting terminals 6a to 6c may be configured to be disposed obliquely relative to the first terminal housing 5 and the first connecting terminals 4a to 4c respectively. By thus applying the gist of the invention, the direction of inserting/removing the second connector portion 3 relative to the first connector portion 2 may be varied. That is, the direction of drawing the cables out from the connector can be mated to the shape of an installation portion, to thereby allow a contribution to space saving.

Also, although in this embodiment it has been described that, unlike the second connecting terminals 6a to 6c, the first connecting terminals 4a to 4c are not connected with cables respectively, the first connecting terminals 4a to 4c are not limited to this structure. The connector 100 in this embodiment may be used for connecting cables to each other.

Also, although in this embodiment, the cables 27a to 27c used have excellent flexibility, rigid cables may be used.

Also, although in this embodiment, a configuration formed with the irregular shape bore 49 has been described as the example of the connecting member 9, the configuration of the connecting member 9 is not limited to the one formed with the irregular shape bore 49. For example, a shaft of a CPA (Connector Position Assurance) lever which fixes mating between the first connector portion 2 and the second connector portion 3 may be configured as the connecting member 9, in which the CPA lever is rotated to fix the mating and to press (or tighten) the connecting member 9 toward the inside of the first terminal housing 5.

Also, in this embodiment, the large diameter part 9a as the connecting member 9 is provided with the irregular shape bore 49 in its upper surface, into which a hexagon wrench (hexagonal spanner) is mated. Although in this embodiment, the specified manipulation tool has been assumed as being a commercial hexagon wrench, the large diameter part 9a of the connecting member 9 may be formed with the irregular shape bore 49 having a shape corresponding to the specified manipulation tool that is not commercialized, with assuming that the non-commercial specified manipulation tool is used.

Also, in this embodiment, the use orientation of the connector is such that the connecting member 9 may be substantially horizontal or substantially vertical. In other words, the use conditions of the connector in this embodiment require no use orientation.

Also, although in this embodiment, the large diameter part 9a of the connecting member 9 is pressed against the adjacent insulator 8a via the elastic member 15 constituting a portion of the connecting member 9, the large diameter part 9a may be pressed directly against the adjacent insulator 8a, not via the elastic member 15.

Although in this embodiment, the connecting member 9 comprises the large diameter part 9a and the small diameter part 9b, a penetrating-type connecting member 9 which penetrates through the stacked structure may be used. Such a configuration can be realized by forming the first connecting terminals 4a to 4c and the first isolating members 43a to 46a with through-hole through which the connecting member 9 penetrates, and forming the tips in the mating direction of the second connecting terminals 6a to 6c and the second isolating members 43b to 45b to have a U-shape. This penetrating-type connecting member 9 allows the facilitation of the constant respective positional relationships of between the first connecting terminals 4a to 4c and the second connecting terminals 6a to 6c relative to the connecting member 9 as a center.

Further, in the present embodiment, it is possible to reduce the cost by using the non-penetrating type connecting member 9 compared with the case using the penetrating-type connecting member 9. Also, this leads to the weight reduction of the connecting member 9, thus allowing a contribution to the weight reduction of the entire connector 1.

Although the invention has been described with respect to the above embodiments, the above embodiments are not intended to limit the appended claims. Also, it should be noted that not all the combinations of the features described in the above embodiments are essential to the means for solving the problems of the invention.

What is claimed is:

1. A connector, comprising:
   a first terminal housing with a plurality of first connecting terminals aligned and accommodated therein;
   a second terminal housing with a plurality of second connecting terminals aligned and accommodated therein, when the first terminal housing and the second terminal housing being mated with each other, one side of the first connecting terminals and one side of the second connecting terminals facing each other to form pairs and provide contacts, respectively, and resulting in a stacked structure of the pairs of the first connecting terminals and the second connecting terminals, in which each of the contacts is sandwiched by an insulator with a predetermined thickness;
   a connecting member pressing the insulator adjacent thereto, to thereby collectively fix the first connecting terminals and the second connecting terminals at the contacts therebetween, for electrical connections between the first connecting terminals and the second connecting terminals, respectively;
   wherein the insulator comprises a first isolating member configured to be fixed to other side of an adjacent first connecting terminal and to cover at least one surface on a tip end side in mating direction of the adjacent first connecting terminal, and a second isolating member configured to be fixed to the other side of an adjacent second connecting terminal and to cover at least one surface on a tip end side in mating direction of the adjacent second connecting terminal,
   wherein the insulator with the predetermined thickness is formed by overlapping the first insolating member and the second isolating member when the first terminal housing and the second terminal housing are mated with each other.

2. The connector according to claim 1, wherein the first isolating member and the second isolating member are formed by dividing the insulator into two parts.

3. The connector according to claim 1, wherein the second isolating member is integrally formed with a second inner housing comprising an insulating material for holding the second connecting terminals to be aligned.

4. The connector according to claim 3, wherein a first thickness of the second isolating member on a side of the second inner housing is thinner and constricted compared with a second thickness of the second isolating member on the tip end side in the mating direction.

5. The connector according to claim 3, wherein the second inner housing is provided with a partition protruding to cover one surface of the second connecting terminal facing to an inner periphery surface of the second terminal housing without obstruction insertion of the first connecting terminal which forms a pair with the second connecting terminal, and the first isolating member fixed to the first connecting terminal of the pair is provided with a guide groove for guiding and bypassing the partition.

6. The connector according to claim 1, wherein at least one of the first isolating member and the second isolating member is configured to cover the first connecting terminal or the second connecting terminal as a fixing object.

* * * * *